United States Patent [19]

Wallace et al.

[11] Patent Number: 4,794,996
[45] Date of Patent: Jan. 3, 1989

[54] CONTROL FOR AN AUTOMATIC SLICING MACHINE

[75] Inventors: Gary L. Wallace, Jeffersontown; Robert K. Moore, Louisville, both of Ky.

[73] Assignee: AMCA International Group, Hanover, N.H.

[21] Appl. No.: 160,840

[22] Filed: Feb. 26, 1988

[51] Int. Cl.⁴ .................... G01G 19/40; G01G 19/52; B26D 7/00

[52] U.S. Cl. ........................ 177/25.14; 177/1; 177/50; 83/77

[58] Field of Search ............... 177/50, 1, 25.14; 83/77; 53/502

[56] References Cited

U.S. PATENT DOCUMENTS

| | | | |
|---|---|---|---|
| 3,846,958 | 11/1974 | Divan | 83/77 X |
| 3,862,666 | 1/1975 | Muskat et al. | 177/50 |
| 3,995,517 | 12/1976 | Smith | 177/50 X |
| 4,100,984 | 7/1978 | Klopfenstein et al. | 177/50 |
| 4,136,504 | 1/1979 | Wyslotsky | 177/50 X |
| 4,545,447 | 10/1985 | Spooner et al. | 177/50 X |

Primary Examiner—George H. Miller, Jr.
Attorney, Agent, or Firm—Burns, Doane, Swecker & Mathis

[57] ABSTRACT

An automatic slicing machine includes a dynamic weigher for weighing slices in a draft as they are being cut. Information from the weigher is converted into a digital value and is used to control the thickness of subsequently cut slices to produce drafts at a target weight. After the cutting of a draft is completed, its weight is checked in a check weigher. The check weigher communicates the weights of individual drafts back to a programmable controller in the slicer. The controller computes a new target weight to correct any deviation of the final weight from the set point for weight control. This automatically calculated correction eliminates manual adjustment by the machine operator and assures that subsequent drafts have an acceptable weight.

10 Claims, 1 Drawing Sheet

CONTROL FOR AN AUTOMATIC SLICING MACHINE

BACKGROUND OF THE INVENTION

The present invention is concerned with automatic slicing machines, and more particularly is directed to a novel method and system for automatically controlling slices cut by a machine so as to produce a group of slices within defined thickness variation limits and in a manner which improves the overall quality of the group of slices, as well as reduces product give-away and lowers waste.

In the slicing of food products, for example the slicing of pork bellies into bacon strips, the slicing operation is carried out in a cyclic fashion. During each cycle a desired number of slices, forming a group known as a draft, are sliced from the pork belly. After one draft is sliced the slicing operation is momentarily interrupted while this draft is carried away from the slicing blade, for example by a conveyor belt, and then the slicing of the next draft begins.

The production of a draft of the sliced product is controlled primarily on the basis of the weight of the product in the draft. For example, bacon is often sold in one pound packages. According to various regulations that protect consumer interests, a package of food that is sold according to weight must contain an amount of the food product that weighs at least the amount specified on the package. While it can contain more than the specified weight, from the producer's point of view it is desirable to maintain the amount of food product in the package as close to the specified weight as possible, without going under it. Including excess amounts of the food product, often referred to as "give-away," can result in significant losses when the producer sells a large volume of the product.

Accordingly, various systems have been devised to automatically control the slicing of a food product so that the actual weight of the draft is as close as practicable to its nominal, i.e. listed, weight. In the past, such control may have been carried out by weighing a draft after all of its slices had been cut, and adjusting the slicing machine so that the slices in subsequent drafts were thinner or thicker if the measured draft was over or under weight, respectively. Such an operation might be labelled a "static" one, since the slicing operation with respect to a draft was completed before that draft's weight was measured.

While better than totally manual systems, these static systems nevertheless had certain limitations. In particular, in these types of systems the correction factor that was applied to subsequently cut slices represented an average weight per slice for the number of slices in the measured draft. This averaging of error over the entire draft does not provide the best results, since a pork belly will vary in weight, height and composition, i.e. ratio of fat to lean, along its length. Thus, the first slice in a draft often may not weigh the same as the last slice in that draft or the slices in the next draft, even if all slices have the same thickness.

This problem is further exacerbated in the high-speed slicing machines that are prevalent in today's industry. Because of the high rate of speed at which these machines slice the product, accurate information about the weight of a draft may not be available until slicing of the third or fourth draft subsequent to the measured draft. Accordingly, if the composition or size of the pork belly varies for each slice, the discrepancy between the average weight per slice of the measured draft and the actual weight per slice of the draft presently being produced could be significant.

As a result, more modern control systems have employed a dynamic control mechanism in which the weight of the draft is determined as the slices are being cut, rather than after the draft is completed. For example, the systems disclosed in U.S. Pat. Nos. 3,508,591 and 3,995,517 weigh the partial draft as each slice is added. On the basis of the measured weight, a prediction of the final weight of the draft is made and used to control the thickness of further slices by varying the feed rate of the product to the slicer. Similarly, U.S. Pat. No. 3,906,823 discloses the process of weighing partial drafts of the product and using the partial draft weights to control the rate of feed of product into the slicer. Another example of a dynamic slice thickness control system is disclosed in commonly assigned, copending application Ser. No. 716,089.

Another factor which influences the sale price of the packages is the quality of the slices. During production, if the final weight of a package needs to be manually adjusted, the operator typically adds or substitutes other slices, e.g., partial or thin slices, that enable the desired final weight to be incrementally approached. These added slices may be less acceptable to the consumer, e.g. they may not cook at the same rate as the other slices, and the overall quality of the package is consequently reduced. When a draft contains slivers, wedge shaped or otherwise non-uniform slices, it will be downgraded and sold for a lower price. Thus, in the control of product slicing it is desirable to produce a draft of the target weight which contains only slices of uniform thickness, as well as to reduce waste in the form of end pieces and slivers, and thereby increase the overall yield per pork belly.

The manner in which the present invention achieves these objectives is explained hereinafter with reference to a preferred embodiment illustrated in the accompanying drawing.

DESCRIPTION OF THE ILLUSTRATED EMBODIMENT

In the following description of preferred embodiments of the present invention, particular reference is made to the slicing of pork bellies to provide a practical illustration of the features of the present invention and the advantages which it offers. It will be appreciated, however, that the invention can be utilized in other types of systems in which it is desired to produce a group of slices of a product having a desired weight.

Figure 1:
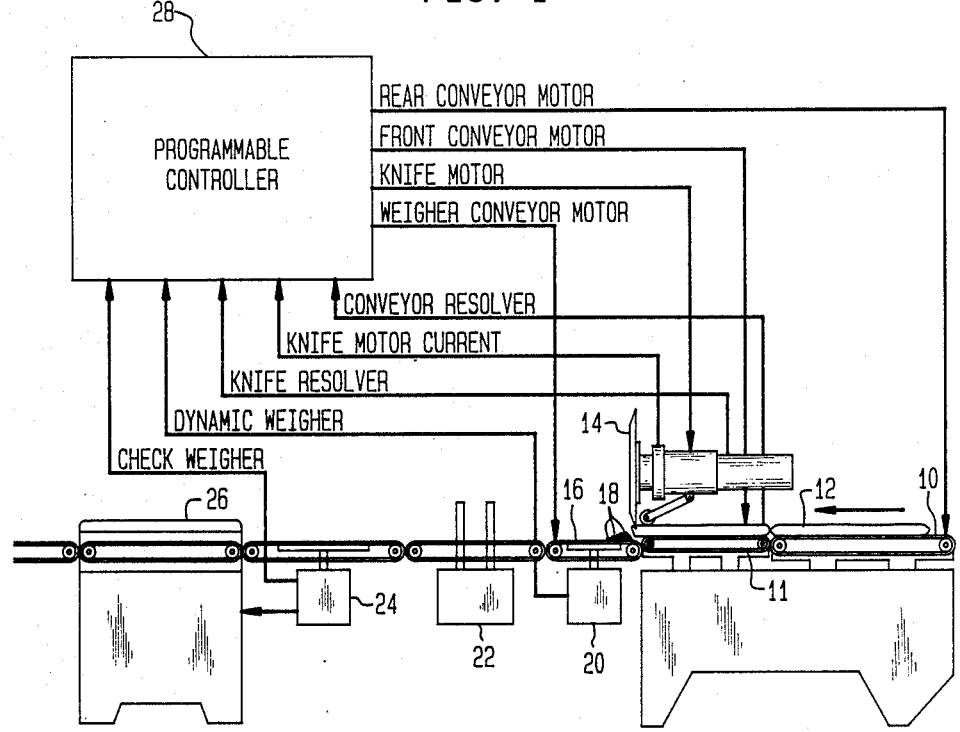
FIG. 1 is a side elevation of a slicing machine of the type to which the present invention is applicable.

Referring to FIG. 1, a slicing system that can be used for slicing bacon and other similar types of food products is shown in a simplified form. The slicing system includes a slicer having a rear, or pusher, conveyor belt 10 and a front, or feed, conveyor belt 11 that feed the pork bellies 12 to a continuously rotating slicing blade 14. A weigher conveyor belt 16 is disposed downstream of the feed belt 11 and removes the bacon slices 18 from the vicinity of the slicing blade.

Figure 2:
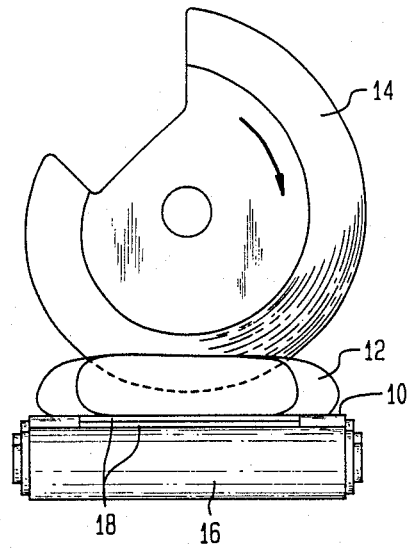
FIG. 2 is a front elevation of the slicing machine.

As is known in this art, the slicing blade 14 has an involute shape, i.e., its radius increases in a circumferential direction as best shown in FIG. 2. This blade is continuously rotated at a predetermined nominal speed, and during the slicing of a draft the position of the feed belt 11 is continuously advanced to feed a pork belly 12 into the blade. The continual feeding of the pork belly combined with the involute shape of the blade results in slices of relatively uniform thickness being sliced from the pork belly, assuming a fixed ratio of belt advancement to knife speed. These slices are deposited on the conveyor belt 16 in an overlapping or "shingled" arrangement. The revolutions of the slicing blade are counted and after the number of slices necessary to produce a full draft have been removed from the pork belly, the feed conveyor 11 is momentarily interrupted and preferably retracted at a high speed, as disclosed in U.S. Pat. No. 4,226,147. During this time, the weigher conveyor 16 continues to move, thereby providing a space on the conveyor between the end of one draft of slices and the beginning of the next draft that is produced when the forward advance of the feed conveyor 11 resumes.

In addition, the conveyor 11 can be automatically stopped and retracted to provide an "auto-trim" function, where the first and last few slices of lower quality bacon from the ends of the pork belly are automatically segregated from the higher quality slices. A system for providing such a function is disclosed in detail in U.S. Pat. No. 4,552,048.

A first scale 20 is disposed in operative relationship with the product conveyor belt 16 to provide an instantaneous indication of the total weight of the slices in the draft as they are cut. This scale provides a continuous read-out of the measured weight on a real time basis. The read-out produced by this scale is dynamic in nature, in the sense that it reflects not only the actual weight of the slices on the belt 16 at any point in time, but also the impact forces generated by the slices as they fall onto the belt. To compensate for the transient fluctuations in the output signal that are caused by the force of each slice as it drops onto the conveyor 16, digital filtering of the output signal, and possible mechanical damping of the movable pedestal of the scale 20, can be employed. When a draft of slices is completed, it passes from the weigher conveyor belt 16 to a card dispenser 22 where a paper card is placed beneath the draft. The draft is then moved to a second weighing scale 24, known as a check weigher, which measures the weight of the total draft. From the check weigher 24, the draft proceeds to a reject conveyor 26. The reject conveyor is operated in response to the weight of the draft as measured by the check weigher. If the measured weight of the draft falls within a range of acceptable values, the draft continues downstream to packaging and labelling equipment (not shown). If, however, the measured weight of the draft falls outside of this range, the draft is diverted by the reject conveyor to a station where an operator can manually adjust the weight of the draft to bring it within the desired limits.

The operation of the system is controlled by a suitably programmed digital controller 28. One example of a controller that can be employed in the context of the invention is a Giddings & Lewis PIC 409 programmable industrial computer. This computer receives input information from various devices within the system. For example, it receives draft weight information as determined by the first weigher 20 and the check weigher 24. It also receives data from resolvers associated with the knife 14 and the feed conveyor 11 to determine their instantaneous positions. In addition, it can receive information relating to the current drawn by the knife motor for use in an auto trimming function as described in the previously cited '048 patent.

In response to these signal inputs and the control program embodied in the memory of the computer 28, various output signals are produced to control the operation of devices within the system. In particular, the computer controls the motor for the knife 14 and the motors for driving each of the conveyors 10, 11 and 16. In a preferred embodiment of the invention, the motors for each of the knife 14, the rear conveyor 10 and the weigher conveyor 16 are operated in open-loop velocity control servo modes. In contrast, the front conveyor 11 is operated in a closed loop position control servo mode by the controller 28. In this mode of operation, the position of the conveyor 11 is referenced to the instantaneous rotational position of the knife 14 so that changes in the rotational speed of the knife, for example due to load variations or production speed changes, result in corresponding adjustment of the speed of the conveyor so as to maintain uniform slice thickness. To this end, the rotational position of the knife 14 can be detected, for example by means of a resolver and applied as one input signal to the controller. The controller receives other input signals related to desired slice thickness and conveyor position, and in response thereto controls the conveyor motor to maintain the instantaneous position of the conveyor 11 commensurate with that of the knife and desired slice thickness.

In particular, the programmable controller receives the dynamic weight data from the first weigher 20 and, in response to this data and other manually entered information relating to desired or target draft weight and desired number of slices, determine the proper thickness for the next slice to be cut. This value is then used to control the incremental positioning of the conveyor 11 to produce slices of appropriate thickness and hence weight. Further information pertaining to this operation is contained in the previously cited application Ser. No. 716,089, the disclosure of which is hereby incorporated by reference.

Because it is highly desirable to achieve a high draft production rate e.g. one draft per second, changes in dynamic characteristics may not provide enough time for the weigher 20 to supply a steady state weight value to the controller 28 after each slice is added to the draft. Fluctuations that may occur in the total draft weights due to this constraint associated with the weigher 20 are reduced in the present invention by calibrating slice thickness calculations with weight measurements of several consecutive drafts. More particularly, the check weigher 24 determines the weight of each completed draft and forwards this information to the controller 28. The measured weight data can be transmitted to the slice thickness controller along a standard RS-232-C digital data link.

The information from the check weigher 24 is used to adjust the desired target weight within the controller 28 that is used to control slice thickness. More particularly, a target value is chosen at the initiation of a slicing operation for controlling the thickness of the slices. This value is then adjusted during the slicing operation in accordance with the static weight information from the check weigher 24. In essence, this operation recalibrates the measurement range of the weigher 20 to change the set point for the slice thickness control. Thus, the need to shut down the slicing line due to erroneous weight readings is avoided.

The foregoing features will now be explained in greater detail. At the initiation of a slicing operation, analog input data regarding the cumulative weight reading as measured by the weigher 20 is received and converted into a digital form. In addition, digital information regarding the instantaneous positions of the knife 14 and the front conveyor 11 is read into the controller 28. Manually entered information regarding the desired draft weight and a target number of slices per draft is used in conjunction with tee digital data to calculate desired slice thickness according to known methods. This calculation is then used to control the incremental positioning of the front conveyor 11.

Prior to the actual slicing of a draft, an auto-taring operation can be carried out to calibrate the weight reading on the weigh scale 20. Once the desired slice thickness has been calculated, the incremental position of conveyor 11 is continually updated in accordance with the detected rotational position of the knife 14 to produce slices of this thickness. Basically, the knife is rotated in an open-loop "master" servo system, and the position of the conveyor 11 is controlled via a closed loop "slave" servo system.

After the slicing of each draft is completed, it is conveyed to the check weigher 24 that weighs the total draft. This weight data is transmitted via a data link to the processor 28 which stores it in appropriate registers. The individual draft weights are averaged in various size groups and a correction is calculated to apply to the dynamic target weight for the automatic weight control system. This correction is applied to the existing target weight either in total or modified by a percentage less than 100%.

More particularly, an operator panel on the slicer includes a knob or the like that is set for the weight goal (W). This number is converted by the controller 28 to a digital equivalent weight $W_{DIG}$, which is used to control the dynamic weight. $W_{DIG}$ contains impact information as well as slice weight data. The product is sliced into drafts with the final weight target (W).

These drafts are then conveyed to the check weigher for weighing. The draft weights are transmitted to the controller 28 where each weight is compared to a desired weight range. If the weight is within the range, the value is stored. If the weight is outside the weight range it is ignored. The ignored weights may be half drafts or other unusable weights, and are determined as follows:

$$W_L < W_1 \ldots _{N-1}, < W_H \quad (1)$$

where $W_L$ = Minimum Weight
$W_H$ = Maximum Weight
$W_1, W_2 \ldots W_{N-1}$ are actual weights
If $W_1 \ldots W_{N-1}$ is outside this range, it is ignored.

After storing a predetermined number of samples (N) the average weight is obtained by dividing the total $W_1 + \ldots W_{N-1}$ by (N).

$$(W_1 + \ldots W_{N-1})/N = W_{AVE} \quad (2)$$

This average weight is then compared to the desired weight (W) and a new digital weight equivalent is obtained for slicing the subsequent drafts.

$$(W \times W_{DIG})/W_{AVE} = New\ W_{DIG} \quad (3)$$

Because the check weigher 24 is some distance from the slicer and the product tends to be very irregular, it may be desirable to change the digital target only a percentage less than calculated, as follows:

$$New\ W_{DIG} - Old\ W_{DIG} = Total\ DW_{DIG}\ change \quad (4)$$

$$DW_{DIG} \times \%\ Change = Actual\ DW_{DIG} \quad (5)$$

$$Old\ W_{DIG} + Actual\ DW_{DIG} = New\ digital\ target\ for\ controlling\ draft\ weights\ dynamically. \quad (6)$$

Furthermore, it may be desirable to adjust the number of drafts N that are used to determine the average weight. For example, when the slicing machine first begins to operate, or after each time the operator manually adjusts the target weight setting, a smaller number of drafts, e.g., 6, can be used to determine the average. As the operation of the machine continues, the number N can be increased until a desired maximum number of drafts is reached, e.g., 30. In this manner, the machine can be quickly calibrated for the proper digital target value $W_{DIG}$ after the desired weight W is changed, and then approach a more steady state mode of operation as slicing continues for that desired weight.

Once the maximum value for N is reached, each successive group of drafts of that number can be used to calculate the new digital target value. Thus, for the example given above, the digital target value $W_{DIG}$ would be recalibrated after every 30 drafts are sliced. Alternatively, it is possible to use a rolling average of the last N drafts. With this approach, the value for $W_{DIG}$ is updated after each draft is sliced.

In a further embodiment of the invention, it is possible to classify the information from the check weigher 24 into different zones within the controller 28, and count the number of drafts which fall into each zone. For example, if the desired weight W is 16 ounces, the draft weights can be classified in the following five zones:

| Zone | Weight Range |
| --- | --- |
| 1 | 15.0–15.5 |
| 2 | 15.5–16.0 |
| 3 | 16.0–16.5 |
| 4 | 16.5–17.0 |
| 5 | 17.0–17.5 |

If the number of drafts falling in any one of the zones 1, 2, 4 or 5 exceeds a predetermined number, the digital target value can be adjusted up or down as appropriate. This predetermined number might be the same for each zone, or be lower for the extreme zones 1 and 5. Alternatively, the number of drafts in a light zone or zones, e.g., zone 2, can be compared to the number of drafts in a higher zone or zones, e.g., zone 4. If the difference between the compared zones exceeds a predetermined value, the digital target weight can be adjusted as appropriate o reduce the difference for the next set of drafts.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for controlling the slicing of a product, comprising the steps of:
    cutting slices of the product;
    dynamically weighing the slices as they are being cut;
    calculating a desired thickness for slices in accordance with the dynamically measured weight and a target weight;
    controlling the thickness of slices in accordance with the calculated thickness;
    grouping a number of consecutive slices into a draft;
    weighing the draft;
    averaging the weights of a predetermined number of drafts;
    determining the difference between the average weight and said target weight; and
    adjusting said target weight by an amount proportional to said difference.

2. The method of claim 1 wherein said dynamic weighing step includes the step of providing an analog signal indicative of the target weight, and said calculating step includes the step of converting said analog signal to a digital value.

3. The method of claim 2 wherein said adjusting step comprises the step of varying said digital value.

4. The method of claim 1 further including the step of varying the predetermined number of drafts.

5. The method of claim 4 wherein said predetermined number is increased up to a maximum preset value as successive groups of drafts are sliced.

6. Apparatus for controlling the thickness of slices cut in a slicing machine of the type in which a product is advanced into a continuously rotating cutting blade, comprising:
    means for grouping slices of the product into drafts;
    first means for providing an indication of the dynamic weight of the slices in a draft whose slices are currently being cut;
    means for manually setting a target value for the weight of each draft;
    means responsive to said target value and said dynamic weight for controlling the rate at which the product is advanced into the cutting blade;
    second means for measuring the total weight of a draft after all of its slices have been cut; and
    means responsive to the weight measured by said second means for adjusting said target value,
    wherein said adjusting means averages the weights of a predetermined number of consecutive drafts, determines the difference between the average weight and said target weight, and adjusts said target weight by the amount proportional to said difference.

7. The apparatus of claim 6 wherein said predetermined number of consecutive drafts is altered when the target value is manually changed so that the number of averaged drafts required is increased by a predetermined amount until a maximum number is reached.

8. The apparatus of claim 6 wherein said average weight is based on a rolling average of a predetermined count so that the said target value is adjusted by an amount proportional to said difference for every draft that is measured by said dynamic weighing means.

9. A method for controlling the slicing of a product, comprising the steps of:
    cutting slices of the product;
    dynamically weighing the slices as they are being cut;
    calculating a desired thickness for slices in accordance with the dynamically measured weight and a target weight;
    controlling the thickness of slices in accordance with the calculated thickness;
    grouping a number of consecutive slices into a draft;
    weighing the draft;
    classifying the draft weight into one of a plurality of weight zones disposed about the target weight;
    determining the number of drafts in the zones about the target weight; and
    adjusting said target weight when the number of drafts in at least one of said zones is outside a threshold range.

10. The method of claim 9 wherein said adjusting step comprises the steps of:
    comparing the number of drafts in at least one weight zone to the number of drafts in at least one other weight zone;
    determining the difference in count between the compared zones; and
    adjusting said target weight when said difference exceeds a predetermined value.

* * * * *